United States Patent [19]

Lafevers et al.

[11] 4,097,910
[45] Jun. 27, 1978

[54] SINGLE GAP MAGNETIC READ HEAD

[75] Inventors: James O. Lafevers; Charles T. Kao, both of Richardson, Tex.

[73] Assignee: Recognition Equipment Incorporated, Dallas, Tex.

[21] Appl. No.: 700,026

[22] Filed: Jun. 25, 1976

[51] Int. Cl.² .......................... G11B 5/16; G06K 7/00
[52] U.S. Cl. ..................................... 360/126; 360/121; 235/449
[58] Field of Search ............... 360/121, 122, 123, 126, 360/128; 235/61.11 D

[56] References Cited

U.S. PATENT DOCUMENTS

| | | | |
|---|---|---|---|
| 3,417,386 | 12/1968 | Schneider | 360/122 |
| 3,479,662 | 11/1969 | Bradford et al. | 360/128 |
| 3,701,858 | 10/1972 | Prival et al. | 360/126 |
| 3,716,677 | 2/1973 | Tanaka et al. | 360/121 |
| 3,999,286 | 12/1976 | Richardson et al. | 360/121 |

Primary Examiner—Robert S. Tupper
Attorney, Agent, or Firm—John E. Vandigriff; Thomas W. DeMond

[57] ABSTRACT

Magnetic ink characters on a document 1A are sensed by a single gap magnetic reading head which employs a segmented linear array having adjoining magnetic sensing elements. Each sensing element is a C-shaped laminated core with the reading head comprising an array of contiguously aligned cores where the core gaps are on an axis perpendicular to a document travel path. A pickoff coil encircles the vertical member of one arm of each laminated core and pickoff coils for juxtapositioned sensing elements are staggered on either side of the core gap so that no two coils are immediately adjacent. A chrome over copper plate about the core gaps is employed to improve the read head wear life and narrow the side-view angle of the sensing elements. The resolution and signal to noise ratio of the sensing element responses thereby is improved.

12 Claims, 7 Drawing Figures

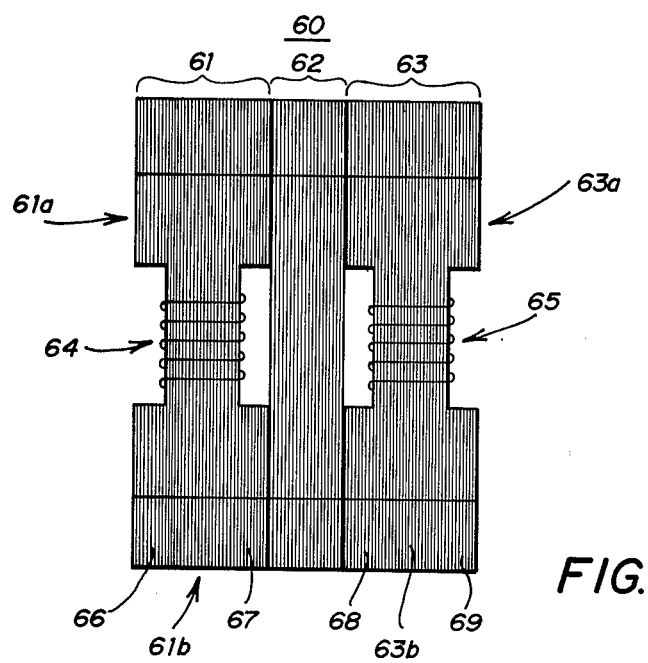
FIG. 5
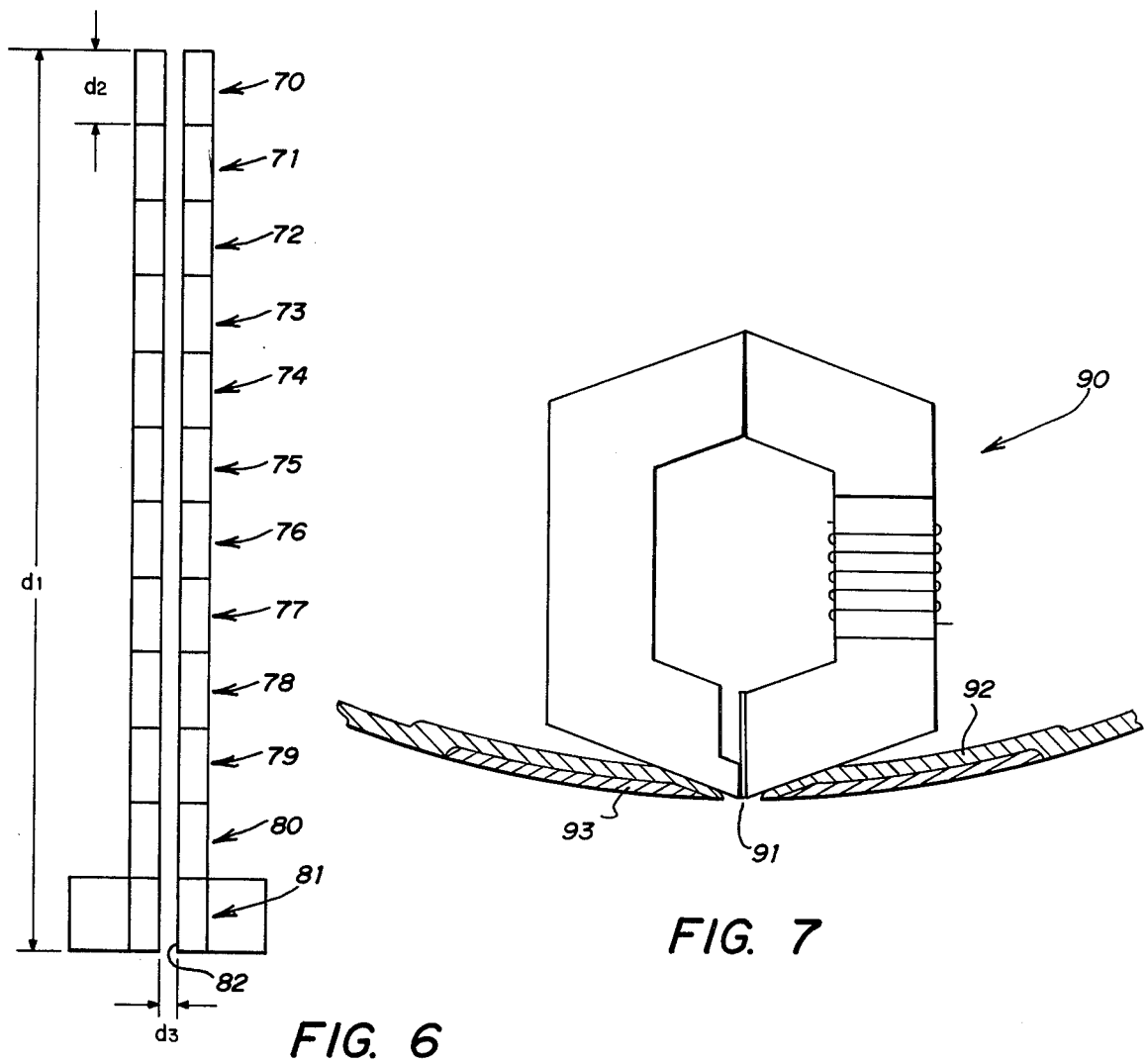
FIG. 6
FIG. 7

4,097,910

SINGLE GAP MAGNETIC READ HEAD

FIELD OF THE INVENTION

This invention relates to single gap magnetic read heads, and more particularly to a single gap magnetic read head having segmented sensing elements positioned without spacing or isolation between adjacent segments.

PRIOR ART

Magnetic ink character recognition (MICR) systems are widely used for sensing information recorded on documents such as checks, credit card slips and the like.

In one type of MICR system, a transport passes documents having magnetic ink characters printed thereon through registration with a write station where the characters are magnetized. From the write station, the document is passed through a read station having a device sensitive to the magnetized characters. The response is in the form of an analog signal having a waveform unique to the particular character sensed.

MICR systems employ a magnetic read head which generates an analog signal representing the first derivative of the magnetic field surrounding the character as a function of time. The analog signal is then processed to identify the magnetic character sensed. A synchronizer or clock is utilized to interrupt the signal from the read head as a function of the space occupied by the character on the document. In this way, a discrete signal is generated which corresponds to a portion of the magnetic field sensed during the passage of a character through registration with the read head.

Single gap readers have long been used in MICR systems and are comprised of a gapped core made of a high magnetic permeability material, and a coil wound about one arm of the core for generating a voltage from variations in the magnetic flux. The voltage induced in the coil is directly proportional to the first derivative of the total magnetic flux linking the coil and the number of turns in the coil. Segmented read heads have been employed with the segments spaced apart and isolated both magnetically and electrically.

Under these conditions, holes in or voids between sensed tracks may occur. In order to overcome such problems, the sensing array must be highly segmented to increase the number of sensing tracks. As the number of sensing elements is increased, however, the cost of the array is increased.

Single gap readers having only a single sensor element also have been used. With a single sensing element, however, the signal to noise ratio is unacceptable as the character height may represent only a small percentage of the sensing element height.

The present invention relates to a single gap read head having a linear segmented sensor array wherein the sensing elements are neither spaced apart nor electrically or magnetically isolated. Further, the sensing elements are of a length to be at least fifty percent covered by the character strokes comprising a print font. The signal to noise ratio of the reading system is improved by exploiting electromagnetic cross talk between adjacent sensing elements.

SUMMARY OF THE INVENTION

In accordance with the present invention, a single magnetic read head includes a plurality of sensing slements each having an air gap aligned along a single gap line and positioned adjacent to each other in side-by-side contact. Each sensing element includes first and second core segments joined at one end and spaced apart at a second end to form the air gap of each element. A pickoff coil is wound about one of the core segments of each sensing element, the pickoff coils alternately wound about the first core segment of one element and the second core segment of an adjacent element.

DESCRIPTION OF THE DRAWINGS

A more complete understanding of the present invention and the advantages thereof, may now be had by referring to the following description taken in conjunction with the accompanying drawings in which:

FIG. 5 is a side view of the magnetic read head of FIG. 1;

FIG. 6 is a plan view of the primary sensing areas of adjoining sensing elements comprising the read head of FIG. 1; and FIG. 7 is a side cross-sectional view of the read head of FIG. 1.

DESCRIPTION OF PREFERRED EMBODIMENTS

Figure 1:
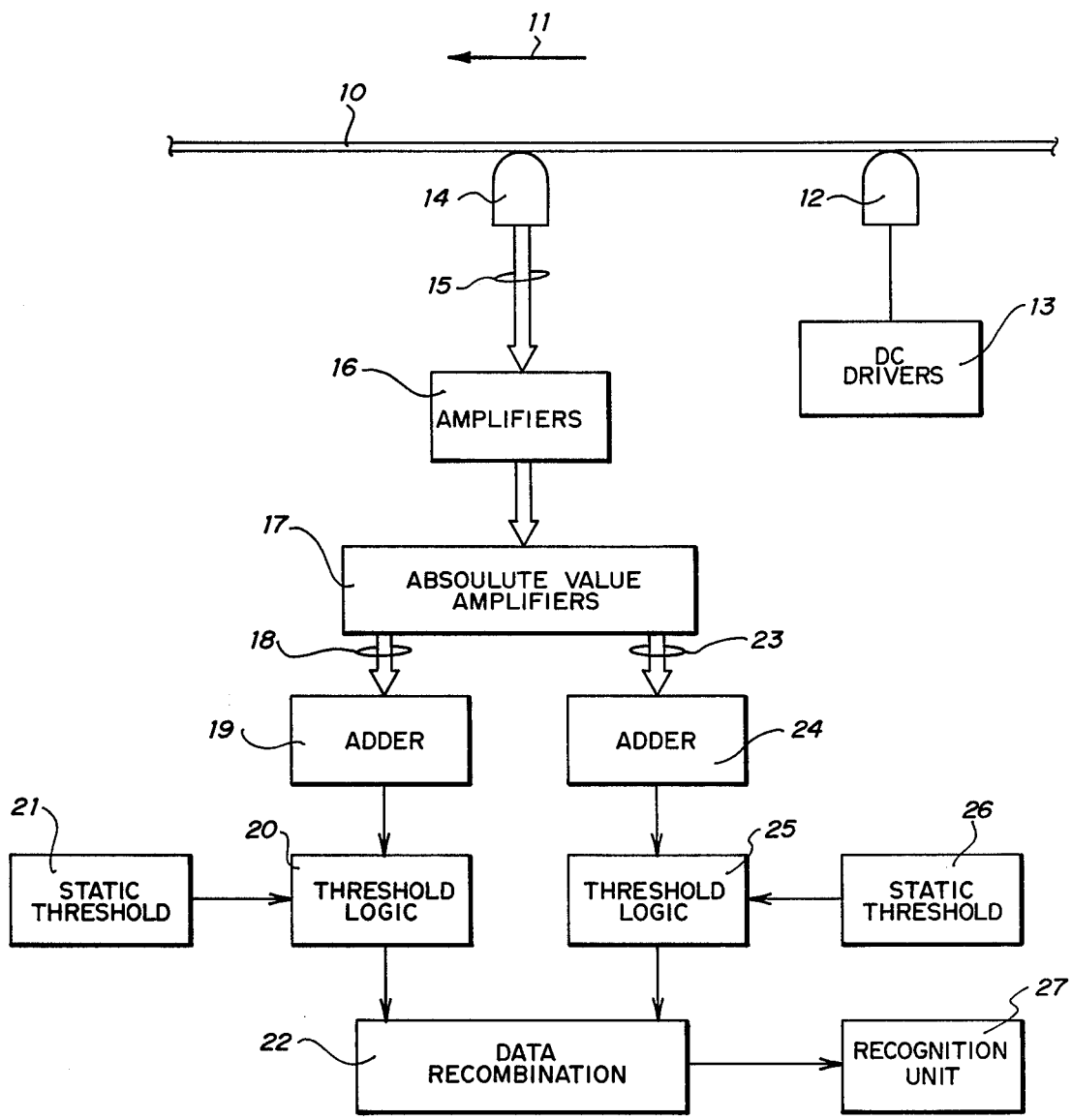
FIG. 1 is a functional block diagram of the present invention.

FIG. 1 is a functional block diagram of a character recognition system embodying the read head of present invention.

A document 10 is transported in the direction of an arrow 11, in a generally well-known manner, passed a read head 12, which is energized by a DC driver 13 to DC magnetize an information field imprinted on the document 10. As the document 10 passes a single gap read head 14, responses of the sensing elements of the read head to the passing magnetized field are applied by way of a data channel 15 to a plurality of gain amplifiers 16 and from the amplifiers 16 to a like number of absolute amplifiers 17. Positive going signals from the sensing elements at the output of the amplifiers 17 are connected by way of a data channel 18 to a positive adder 19 which sums the positive going signals. A single information signal is generated at the output of the adder 19 which is applied to the input of a threshold logic unit 20. Treshhold logic unit 20 digitizes the information signal with respect to a static threshold voltage provided at the output of static threshold unit 21. The digitized information signal is applied to one input of data recombination logic 22.

The negative going signals from the sensing elements of the read head are applied from the outputs of the absolute value amplifiers 17 by means of a data channel 23 to a negative adder 24. Adder 24 sums the negative going signals to form a single information signal that is applied to a threshold logic unit 25. Logic unit 25 digitizes the information signal with respect to a static threshold voltage supplied at the output of a static threshold generator 26. The digitized output signal from the logic unit 25 is applied to a second input of the data recombination logic 22.

Data recombination logic 22 merges the digitized information signals formed from the positive and negative going signals of the read head sensing elements, and applies the merged information signal to a character recognition unit 27 where the character sensed by the read head 14 is identified.

FIG. 2

Figure 2:
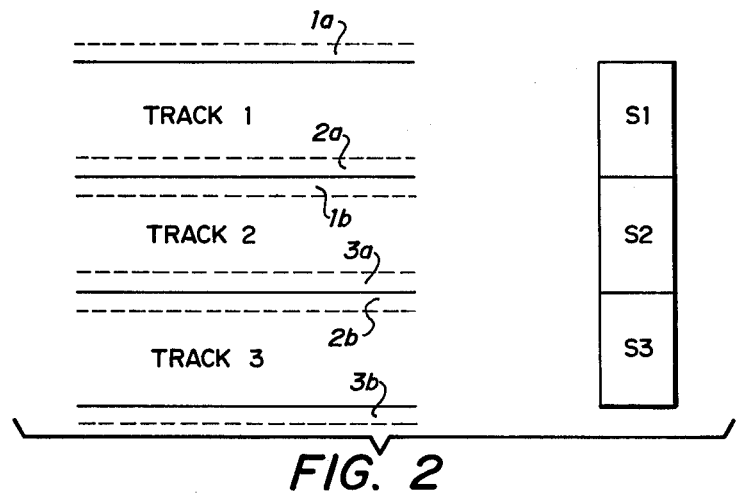
FIG. 2 illustrates what is known as a MICR system with the magnetic reading head the "side view effect" of adjoining sensing elements of a magnetic read head.

Referring to FIG. 2, with three sensors S1, S2 and S3 adjoined according to the invention, a document is scanned along tracks 1-3, respectively. No void or dead spaces occur between tracks in as much as the tracks are adjacent and reader resolution is thus improved.

A magnetic sensing element typically detects changes in magnetic flux that occur at a distance of up to one-fourth of the sensor cross-talk dimension from the sensor edge. Such peripherial sensitivity is generally referred to as the "side view effect."

With magnetic sensing elements of prior reading heads, the side view effect has adversely affected the resolution and signal-to-noise ratio of the element response. Sensing element spacers that provide electrical and magnetic isolation between adjacent sensing elements have been employed to eliminate the side view effect. The sensing elements of the present invention, however, exploits the side view effect to increase the signal-to-noise ratio of the element response without compromising resolution.

The side view effect is illustrated in FIG. 2, wherein the extent of the effect for each of sensing elements S1-S3 is illustrated by dotted lines. For example, the side view effect of sensing element S1 extends the sensing area of the element to include track portions 1a and 1b. Similarly, the sensitivity of sensing element S2 extends to track portions 2a and 2b, and the sensitivity of sensing element S3 extends to track portions 3a and 3b.

FIG. 3

Figure 3:
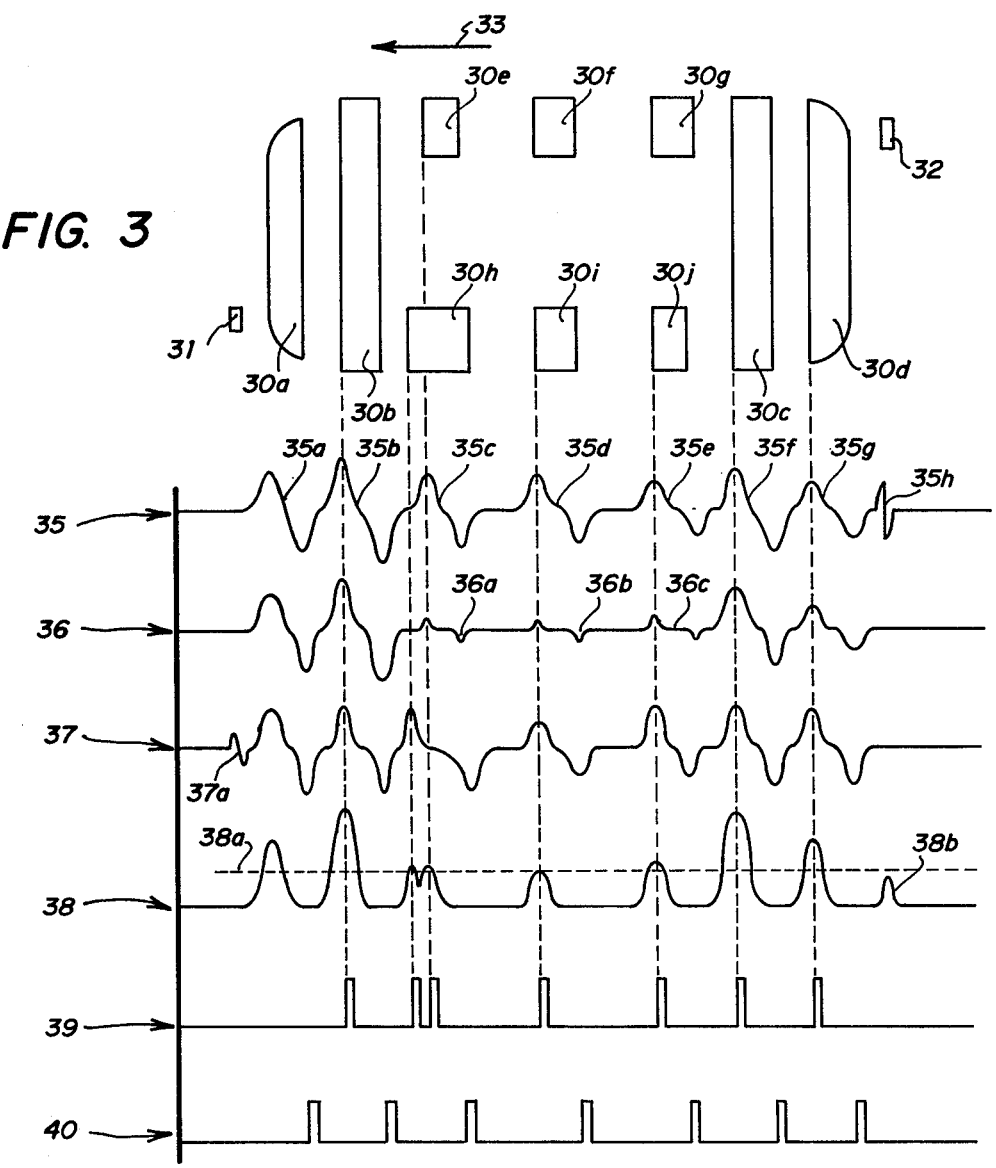
FIG. 3 is a diagrammatic representation of a magnetically encoded character with output waveforms diagramming the responses of sensing elements to movement of the character.

Referring to FIG. 3, the numeral zero is comprised of long magnetic ink bars 30a-30d, L and short magnetic ink bars 30e-30j. Ink splatters 31 and 32 are provided for a more representative reading environment. As the document upon which the numeral zero is imprinted moves in the direction of arrow 33, the ink splatter and magnetic ink bars comprising the numeral zero pass through registration with sensing elements such as the sensing elements S1-S3 of FIG. 2.

Referring to FIG. 3, the waveform 35 illustrates the response generated by the sensing element S1 to the magnetic ink bars 30a-30d, 30e-30g, and ink splatter. A waveform portion 35a includes a positive going peak at the leading edge of magnetic bar 30a, L and a negative going peak at the trailing edge of bar 30a. A waveform portion 35b includes a positive going peak at the leading edge of magnetic bar 30b, and a negative going peak at the trailing edge of bar 30b. Waveform portions 35c-35g are similarly aligned with magnetic bars 30e-30g and 30c-30d, respectively. In addition, waveform portion 35h includes a positive going peak at the leading edge of ink splatter 32, and a negative going peak at the trailing edge of the ink splatter.

As the magnetically encoded character S2 passes through registration with the sensing element S2, the element will detect the leading and trailing edges of magnetic ink bars 30a-30d. The short magnetic bars 30e-30j are not within the primary track of element S2; however, the side view effect of this sensor is reflected by the waveform portions 36a-36c of waveform 36 which have peaks occurring at the leading and trailing edges of magnetic bars 30e-30g, respectively.

Waveform 37 illustrates the response of sensing element S3 to ink splatter 31, and to the leading and trailing edges of magnetic ink bars 30a-30d and 30h-30j. More particularly, waveform portion 37a includes a positive going peak occurring at the leading edge of ink splatter 31, and a negative going peak ocurring at the trailing edge of the ink splatter.

Waveforms 35-37 illustrate the sensitivity of the sensing elements S1-S3 to the changes in magnetic flux occurring at the leading and trailing edges of magnetic ink bars. Waveform 38 illustrates a composite waveform formed by summing the positive going wave portions of waveforms 35-37. Superimposed upon the waveform 38 is a static threshold level 38a represented by a horizontal dotted line. Waveform 39 is a leading edge signal formed by thresholding waveform 38 with respect to the static threshold level 38a. As may be seen by inspection of waveforms 38 and 39, the pulse 38b corresponding to the waveform portion 35h of waveform 35 is eliminated during the thresholding. Further, by comparing waveforms 37 and 38, it may be seen that the waveform portion 37a has been absorbed in the summation process represented by waveform 38.

Waveform 40 illustrates a trailing edge signal which is formed as a result of a summation and thresholding process applied to the negative going wave portions of the waveforms 35-37 as described above for the leading edge signals.

FIG. 4

Figure 4:
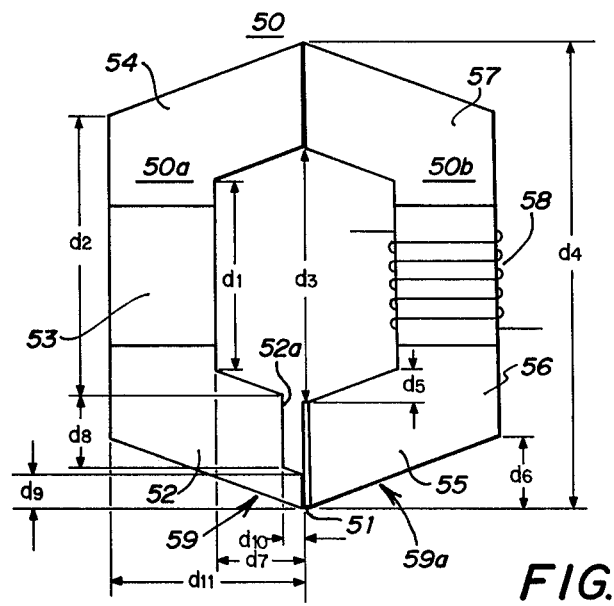
FIG. 4 is an end view of a segmented magnetic sensing element of the read head of FIG. 1.

Referring to FIG. 4, a magnetic sensing element 50 is comprised of C-shaped core sections 50a and 50b joined at one end and spaced apart at the other end by a spacer 51 to form a core gap. Section 50a includes a vertically inclined core segment 52 having a cut out portion 52a. Segment 52 terminates at a vertical core segment 53 which in turn terminates at a vertically inclined core segment 54. Core section 50b includes a vertically inclined core segment 55 terminating at a vertical core segment 56, and thence to a vertically inclined core segment 57. Vertical core segment 56 is encircled with windings to form a pickoff coil 58 for sensing the change in magnetic flux about the core. In operation, the primary sensing areas of the sensing element are the outer surfaces 59 and 59a of core segments 52 and 55, respectively.

Core sections 50a and 50b are joined in opposing relationship with the ends of core segments arms 54 and 57 in contact. The ends of core segments 52 and 55 are separated by the spacer 51.

In the preferred embodiment described herein, the core sections 50a and 50b are formed from C-shaped steel laminations having a high magnetic permeability on the order of 80. Such laminantions are manufactured and sold by Plessey Microseince, Inc. of Mountain View, California.

In a model of the sensing element of FIG. 4, the inside length $d1$ of the vertical core segments 53 and 54 is 0.350 inches and the outside length $d2$ is 0.40 inches. The inner dimension $d3$ of a C-shaped laminent is 0.40 inches, and the outside edge dimension $d4$ is 0.50 inches. The vertical distance $d5$ between the inner end corner of a vertically inclined core segment and the inner corner where an inclined core segment joins a vertical segment is 0.25 inches. The dimension $d6$ between inner and outer corners of the end of a vertically inclined core segment is 0.050 inches. The horizontal dimension $d7$ between an outer end corner of a vertically inclined core segment and an inner corner where the inclined segment merges with a vertical segment is 0.05 inches. The cut out portion 52a has a vertical wall having a length $d8$ of 0.032 inches and an inclined wall dimension $d9$ of 0.018 inches from the outer end edge of core segment 52. The cut out portion 52a has a width $d10$ of approximately 0.02 inches and the distance d11 between the outer end edge of segment 52 and the outer corner where segment 52 merges into vertical core segment arm 53 is approximately 0.10 inches.

Each laminant of the sensing element 50 is joined at one end with an epoxy glue, and also adhesively joined to opposite sides of a milar spacer, such as spacer 51, with epoxy glud. The milar spacer has a thickness to provide a gap of approsimately 0.002 inches between the end of core segments 52 and 55.

The pick off coil 58 is wound with a 50 A.W.G. magnetic wire and the number of turns in the coil varies with the position of the sensing element the segmented read head, and further upon the manufacturing method used to form and package the read head. As a general rule, each of the coils of the read head is wound such that by applying a 225 millivolt signal at 10 KHz with a universal bridge such as that manufactured and sold by Marconi Instruments, Inc., Model No. TS1313. The number of turns of the coils provides an 8 millihenry inductance in the balanced state.

FIG. 5

Referring to FIG. 5, for purposes of description, the read head 60 is comprised of three magnetic sensing elements, 61–63. Each of the sensing elements assembled from thin laminants of high magnetic permeability adhered together with an epoxy glue. The vertical core segments of alternate ones of the magnetic sensing elements have an upper section of greater width than the lower section. More particularly, sensing elements 61 and 63 have upper vertical sections 61a and 63a which are of greater width than lower vertical sections 61b and 63b, respectively. Magnetic sensing element 62, however, is comprised of a vertical core segment of uniform width. The lower end of section 61b is spaced apart from adjacent sensing elements by spacers 66 and 67, and the lower end of section 63b is spaced apart from adjacent sensing elements by spacers 68 and 69.

In the preferred embodiment described herein, the spacers 66–69 are formed from brass strips approximately 0.005 inches thick. The width of the upper vertical arm sections 61a and 63a is approximately 0.053 inches, and the width of lower vertical arm sections 61b and 63b is approximately 0.043 inches. Each of sensing elements 61–63 is formed from laminants having a thickness of approximately 0.002 inches.

A pick off coil is wound on each of the lower sections 61b and 63b, such as pick off coils 64 and 65, respectively. The vertical core segment of the far side of sensing element 62 is wound with a pickoff coil in a manner similar to that illustrated in FIG. 5 for sensing elements 61 and 63. Thus, in accordance with the invention, alternate vertical core segments of the segmented magnetic read head on either side of the sensor gap are wound with a pickoff coil to generate a voltage by a change in magnetic flux, resulting from movement of the document 10. Each sensing element has one coil wound therein and no two coils are immediately adjacent or aligned across the sensor gap.

FIG. 6

Referring to FIG. 6, 12 magnetic sensing elements 70–81 are aligned along a primary sensor area comprising a gap 82 to form a linear single-gap array. Each of the sensing elements are placed in contact one to the other without spacing therebetween, and without magnetic or electrical shielding.

The side-by-side positioning of the primary sensor area of adjacent sensing elements is made possible by the C-shaped structure of the sensing elements. Further, the negative signal interference experienced by prior systems has been obviated through the laminated construction C-shaped sensing elements, and through the staggered placement of the pickoff coils in the sensor array.

In the preferred embodiment described herein, the core gap of each of the sensing elements is approximately 0.053 inches in length ($d2$) and 0.002 inches in width ($d3$). The entire sensor array comprised of 12 sensing elements is approximately 0.636 inches in length ($d1$). The width of the primary sensing area of a sensing element on either side of the core gap is approximately 0.18 inches. The remaining surfaces of the sensing element is shielded as will be further explained.

Twelve sensing elements were selected for the read head of the present invention in order to ensure that at least 25% of the length of one of the sensing elements is excited under the worst case conditions when a bar encoded magnetic ink character is scanned. Such a worst case condition occurs, for example, with the character includes a spaced bar font. In that event, a single sensing element may sense portions of a character stroke on either side of the sensor gap, and may span an area exceeding the length of the shortest of the character strokes.

The width of gap 82 is chosen as a compromise between gain and resolution in reading a magnetic bar character printed in magnetic ink on a document having a linear transport velocity of 400 inches per second. When a character stroke covers more than one continuous sensing element, a gain increase of 10 to 15 percent gain is achieved due to the side view effect of the sensing elements.

The preferred sensor array described herein has an operating frequency of 100 KHz, a signal-to-noise ratio of approximately 30 $db$ and a gain variance of approximately 15% across the entire array.

FIG. 7

Referring to FIG. 7, the primary sensing area of a linear single-gap magnetic read head 90, formed in accordance with the invention, is position with a view port 91 surrounded by a copper plate 92 having a thickness of approximately 0.006 to 0.10 inches. Over the copper plate 92 is placed a chrome plate 93 having a thickness of approximately 0.006 inches. The copper plate 92 provides an eddy current shield to reduce the noise which may be incurred by stray magnetic flux entering the read head. The chrome plate 93 provides a hard surface having a long wear life to withstand the continual rubbing of document surfaces past the read head.

The view port is approximately 0.005 inches in width. The field of view thus is narrowed to the primary sensing areas near the sensor gap. The magnetic character strokes of characters to be read, therefore, are sensed substantially at the gap line for improved reliability and resolution.

Having described the invention in connection with certain specific embodiments thereof, it is to be understood that further modifications may now suggest themselves to those skilled in the art, and it is intended to cover such modifications as fall with the scope of the appended claims.

What is claimed is:

1. A single gap magnetic read head, comprising:
   a plurality of sensing elements each having an air gap aligned along a single gap line and positioned adjacent each other in side-by-side magnetic contact, each sensing element including:
      first and second core segments joined at one end and spaced apart at a second end to form the air gap of each element, and
      a pickoff coil wound about one of the core segments of each sensing element, the pickoff coils alternately wound about the first core segment of one element and the second core segment of an adjacent element.

2. A single gap magnetic read head as set forth in claim 1 including a spacer of a nonmagnetic material in the air gap of each sensing element.

3. A single gap magnetic read head as set forth in claim 1 wherein the first and second core segments of each element are C-shaped segments.

4. A single gap magnetic read head as set forth in claim 3 wherein each C-shaped segment includes a first angle segment extending from the air gap and terminating at a vertical segment that extends to a transition with a second angle segment, and the second angle segments of the first and second core segments of each element are joined.

5. A single gap magnetic read head as set forth in claim 4 wherein the pickoff coil for each element is wound about the vertical segments of each C-shaped segment.

6. A single gap magnetic read head as set forth in claim 5 wherein the second angle segment of one element has a greater gap line dimension than the second angle segment of an adjacent element.

7. A single gap magnetic read head as set forth in claim 1 wherein each sensing element comprises a plurality of laminations of magnetic material joined to form the core segments.

8. A single gap magnetic read head, comprising:
   a plurality of sensing elements each having an air gap aligned along a single gap line and positioned adjacent each other in side-by-side magnetic contact, each sensing element comprising:
      first and second core segments joined at one end and spaced apart at a second end to form the air gap of each element, and
      a pickoff coil wound about one of the core segments of each sensing element, the pickoff coils alternately wound about the first core segment of one element and the second core segment of an adjacent element, and
   a magnetic shield plate positioned in proximity to and aligned with the air gap of the sensing elements on either side of the gap line.

9. A single gap magnetic read head as set forth in claim 8 wherein said magnetic shielding plate comprises a copper plate with an elongated slot, wherein the elongated slot is aligned along the single gap line.

10. A single gap magnetic read head as set forth in claim 9 including a wear shield secured to said copper plate on the side thereof opposite the plurality of sensing elements.

11. Magnetic read head as set forth in claim 8 including nonmagnetic spacers between adjacent sensing elements away from said air gap.

12. A single gap magnetic read head, comprising:
   a plurality of sensing elements positioned adjacent each other, each sensing element of said plurality of sensing elements having an air gap aligned along a single gap line, each sensing element being in magnetic contact adjacent the single gap line with adjacent sensing elements, each sensing element comprising:
      first and second core segments joined at one end and spaced apart at a second end to form the air gap of each element, and a pickoff coil wound about one of the core segments of each sensing element, the pickoff coils alternately wound about the first core segment of one element and the second core segment of an adjacent element.

* * * * *